United States Patent [19]

Pasternak

[11] Patent Number: 4,865,745

[45] Date of Patent: Sep. 12, 1989

[54] METHOD OF TREATING DILUTE AQUEOUS SOLUTIONS

[75] Inventor: Mordechai Pasternak, Spring Valley, N.Y.

[73] Assignee: Texaco Inc., White Plains, N.Y.

[21] Appl. No.: 188,992

[22] Filed: May 2, 1988

[51] Int. Cl.$^4$ .............................................. B01D 13/00
[52] U.S. Cl. ................................... 210/651; 210/654; 210/500.39
[58] Field of Search ...................... 210/651, 652, 195.2, 210/644, 654, 500.39, 500.37, 634, 640, 500.38

[56] References Cited

U.S. PATENT DOCUMENTS 4,617,127 10/1986 Light .................................. 210/654
4,717,482 1/1988 Light .................................. 210/654

*Primary Examiner*—Frank Sever
*Attorney, Agent, or Firm*—Robert A. Kulason; James J. O'Loughlin; Carl G. Seutter

[57] ABSTRACT

A dilute aqueous solution of isopropanol is concentrated by reverse osmosis across a membrane of polyethyleneimine which has been cross-linked with 2,4-toluene diisocyanate.

18 Claims, No Drawings

METHOD OF TREATING DILUTE AQUEOUS SOLUTIONS

FIELD OF THE INVENTION

This invention relates to a method of treating dilute aqueous solutions. More particularly it relates to a process for treating dilute aqueous solutions to yield product characterized by decreased content of water.

BACKGROUND OF THE INVENTION

As is well known to those skilled in the art, it is possible to remove water from mixtures thereof with organic liquids by various techniques including adsorption or distillation. These conventional processes, particularly distillation, are however characterized by high capital cost. In the case of distillation for example, the process requires expensive distillation towers, heaters, heat exchangers (reboilers, condensers, etc.), together with a substantial amount of auxiliary equipment typified by pumps, collection vessels, vacuum generating equipment, etc.

Such operations are characterized by high operating costs principally costs of heating and cooling plus pumping, etc.

Furthermore the properties of the materials being separated, as is evidenced by the distillation curves, may be such that a large number of plates may be required, etc. When the material forms an azeotrope with water, additional problems may be present which for example, could require that separation be effected in a series of steps (e.g. as in two towers) or by addition of extraneous materials to the system.

There are also comparable problems which are unique to adsorption systems.

It has been found to be possible to utilize membrane systems to separate mixtures of miscible liquids by reverse osmosis. In this process, the charge liquid is brought into contact with a membrane film; and one component of the charge liquid preferentially permeates the membrane. The permeate is then recovered as a liquid from the downstream side of the film.

Additional background may be obtained from (i) USP 4,411,787 to UOP as assignee of Riley; (ii) J. E. Cadotte et al J. Macromol. Sci-Chem A15 (5) p 727 (1981); (iii) L. T. Rozelle et al Chapter 12 in *Reverse Osmosis and Synthetic Membranes* S. Sourirajan (Ed).

It is an object of this invention to provide a process for dewatering dilute aqueous solutions. Other objects will be apparent to those skilled in the art.

STATEMENT OF THE INVENTION

In accordance with certain of its aspects, this invention is directed to a method which comprises passing a char dilute solution of an organic oxygen-containing liquid component which is soluble in water into contact with, as reverse osmosis membrane, a non-porous separating polyimine layer which has been crosslinked with a polyisocyanate —NCO or with a poly(carbonyl chloride) —COCl crosslinking agent;

maintaining a pressure drop across said membrane thereby forming a high pressure retentate containing increased content of organic oxygen-containing component and decreased content of water and a low pressure permeate of increased content of water and decreased content of organic oxygen-containing component;

maintaining the pressure on the low pressure discharge side of said membrane above the vapor pressure of said permeate thereby maintaining said permeate in liquid phase;

maintaining the pressure on the high pressure retentate side of said membrane above the vapor pressure of said charge aqueous dilute solution and of said retentate and sufficient to drive permeate across said membrane by reverse osmosis thereby maintaining said charge aqueous dilute solution and said retentate in liquid phase;

recovering said permeate of increased content of water and decreased content of organic oxygen-containing component, in liquid phase from the low pressure discharge side of said membrane; and recovering said retentate of increased content of organic oxygen-containing component and decreased content of water, in liquid phase from the high pressure side of said membrane.

DESCRIPTION OF THE INVENTION The Charge Solution

The charge aqueous solution of organic oxygen-containing liquid component which may be treated by the process of this invention may include oxygen-containing compounds such as alcohols, glycols, organic carboxylic acids, polyols, aldehydes, ketones, etc. When the oxygen-containing component is an alcohol, it may be for example ethanol, propanol, isopropanol, n-butanol, isobutanol, t-butanol, hexanols, octanols, etc. When the oxygen-containing component is a glycol it may be for example ethylene glycol, propylene glycol, butylene glycol, etc. When the oxygen-containing component is a polyol, it may be for example glycerine, sorbitol, pentaerythritol, trimethylolmethane, polyoxyethylene (or polyoxypropylene) polyol, etc. When the oxygen-containing component is an acid, it may for example be acetic acid, propionic acid, butyric acid, etc. When the oxygen-containing component is an aldehyde, it may for example be formaldehyde, acetaldehyde, etc. When the oxygen-containing component is a ketone, it may for example be acetone, methyl ethyl ketone, acetophenone, etc.

It is a particular feature of the process of this invention that the advantages thereof may be most readily apparent when the charge aqueous solution is a dilute aqueous solution.

Although the advantages may be attained when the charge dilute solution contains up to say 30 w % or more of organic oxygen-containing component, it may be found that desired results are obtained when the charge dilute solutions are at or below the 20 w % level. It is particularly found that desired results may be attained when the charge contains 0.5–5 w % oxygenate.

The instant process may find particular use in connection with other concentration techniques. For example, a particular charge solution may be concentrated by distillation up to a point at which further concentration by distillation may be uneconomical. A charge may, for example, be concentrated to a point at which an azeotrope is formed. In alternative aspects, the process of the instant invention may be employed first, followed, for example, by distillation. Clearly in each case the number of separation steps and the particular sequence will depend on the economics of the particular system which of course depend on the composition and properties of the charge solution.

The process of this invention is found to be particularly useful in treating charge solutions containing ethylene glycol (in concentration as low as 1 w %) or isopropanol (in concentration as low as 5 w %) to recover product containing decreased quantities of water.

Illustrative charge solutions which may be employed in practice of the process of this invention may include:

(i) 1 w % ethylene glycol 99 w % water
(ii) 5 w % ethylene glycol 95 w % water
(iii) 0.5 w % ethylene glycol 99.5 w % water
(iv) 5 w % ethanol 95 w % water
(v) 8 w % acetic acid 92 w % water
(vi) 10 w % acetaldehyde 90 w % water
(vii) 5 w % isopropanol 95 w % water

THE MEMBRANE ASSEMBLY

Practice of the process of this invention may be carried out by use of a composite structure which in one preferred embodiment may include (i) a carrier layer which provides mechanical strength, (ii) a porous support layer, and a separating layer or membrane across which reverse osmosis occurs.

The composite structure of this invention includes a multi-layer assembly which in the preferred embodiment preferably includes a porous carrier layer which provides mechanical strength and support to the assembly.

THE CARRIER LAYER

This carrier layer, when used, is characterized by its high degree of porosity and mechanical strength. It may be fibrous or non-fibrous, woven or non-woven. In the preferred embodiment, the carrier layer may be a porous, flexible, non-woven fibrous polyester.

A preferred non-woven polyester carrier layer may be formulated of non-woven, thermally-bonded strands of polyester and characterized by a fabric weight of 80±8 grams per square yard, a thickness of 4.2 0.5 mils, a tensile strength (in the machine direction) of 31 psi and (in cross direction) of 10 psi, and a Frazier air permeability of 6 cu.ft/min./sq. ft. @0.5 inches of water.

THE POROUS SUPPORT LAYER

The porous support layer useful in practice of the process of this invention may be preferably formed of a sheet of polysulfone polymer. Typically the polysulfone may be of thickness of 40–80 microns, say 50 microns and of molecular weight $\overline{M}_n$ of 5,000–100,000, preferably 20,000–60,000 say 40,000. The polysulfone is preferably characterized by a pore size of less than about 500 A. This corresponds to a molecular weight cut-off of less than about 25,000, typically about 20,000.

The sulfone polymers which may be employed may include those made from cumeme containing isopropylidene groups in the backbone; e.g.

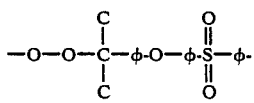

These isopropylidene sulfones, containing as repeating units ether-aromatic-isopropylidene-aromatic-ether aromatic-sulfone-aromatic groups, may typically have a molecular weight $\overline{M}_n$ of 15,000–30,000, a water absorption (at 20° C.) of about 0.85w %, a glass transition temperature of 449° K, a density of 1.25 mg/m³, a tensile strength (at 20° C.) at yield of 10,000 psi, and a coefficient of linear thermal expansion of $1.6 \times 10^{-5}$ mm/mm/° C.

It is found, however, that the preferred sulfone polymers which may be employed in practice of the process of this invention, may include those which are free of isopropylidene moieties in the backbone chain and wherein the phenylene groups in the backbone are bonded only to ether oxygen atoms and to sulfur atoms. These preferred polymers, which may typically be prepared from

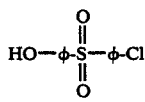

may be characterized by a backbone containing the following repeating groups:

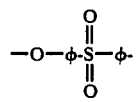

A preferred sulfone polymer may be a polyether sulfone which is free of isopropylidene moieties in the backbone chain and wherein the phenylene groups in the backbone are bonded only to ether-oxygen atoms and to sulfur atoms. This polymer may be characterized by molecular weight $\overline{M}_n$ of 25,000, water absorption @20° C. of 2.1 w %, glass transition temperature of 487° K., tensile strength at yield of 2,200 psig at 20° C.; and a coefficient of linear thermal expansion of $5.5 \times 10^{-5}$ mm/mm/° C. This polymer has a molecular weight cut off of about 20,000 and has a pore size of about 200 A.

THE SEPARATING LAYER

The separating layer which permits attainment of separation in accordance with the process of this invention includes a non-porous film or membrane of 0.2–1 microns, say about 0.5 microns of a polyimine polymer of molecular weight $\overline{M}_n$ of 40,000–100,000, say about 70,000 which is cross-linked by urea or amide linkages.

The separating layer may be prepared by cross-linking a polyimine polymer or alternatively by forming the cross-linked polymer in situ.

In the preferred embodiment, a polyimine polymer is cross-linked. Polyimine polymers are characterized by the presence of recurring —N—R''—groups as integral parts of the main polymer, chain. Typical structural formulae of linear polyimines may be represented as

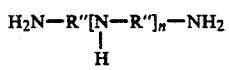

wherein n represents the degree of polymerization or number of recurring groups in the polymer chain.

Illustrative polyimine polymers include those of molecular weight $\overline{M}_n$ of 40,000–100,000, say 60,000.

Suitable polyimines may include, the first listed being preferred:

TABLE

A. Cordova Chemical Company Corcat P-600 brand of polyethyleneimine resin membrane ($\overline{M}_n$ of 60,000) in 33 w % aqueous solution —Brookfield viscosity @25° C. of 5000 cP, Sp.Gr @25° C. of 1.04–1.06, and pH of 10–11, having the formula

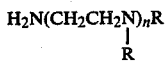

wherein R is H or

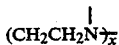

(containing 30% primary, 40% secondary, and 30% tertiary amines)

B. Dow Chemical Co Tydex 12 brand of polyethyleneimine membrane ($\overline{M}_n$ of 50,000) in 30 w % aqueous solution having the same formula as the Corcat P-600 membrane.

Cross-linking of the preformed polyimine polymer may be effected by contact with, as cross-linking agent,

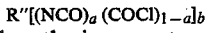

When the isocyanate cross-linking agent $R''(NCO)_b$ is employed the cross-linking forms urea bonds. When the carbonyl chloride cross-linking agent $R'(COCl)_b$ is employed the cross-linking forms amide bonds.

In practice of this aspect of the invention, cross-linking is effected by contacting the surface of the membrane with a 0.1 w %–0.8 w %, say 0.4 w % solution of cross-linking agent in solvent, typically of hydrocarbon such as hexane. Contact may be at 20° C.–40° C., say 25° C. for 15–60 seconds, say 30 seconds.

Thereafter the membrane may be cured at 110° C.–150° C., say 125° C. for 10–20 minutes, say 15 minutes.

When the cross-linked polyimine polymer is to be formed in situ, it may be the reaction product of (i) a polyamine and (ii) a polyisocyanate and/or a poly (carbonyl chloride):

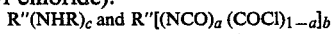

wherein R is a monovalent hydrocarbon moiety;
R'' is a polyvalent hydrocarbon moiety;
a is 0 or 1; and
b and c are integers greater than 1.

The first reactant $R''(NHR)_c$ is a polyamine (i.e. a preferably monomeric compound containing a plurality of amine groups). In this compound, may be an integer greater than one. When c is two, the first reactant is a diamine.

R'' maybe a polyvalent hydrocarbon moiety such as in 1,3,5-benzene tri(carbonyl chloride). In the preferred embodiment, R'' maybe a divalent moiety.

In the above formula, R'' may preferably be a hydrocarbon group selected from the group consisting of alkylene, aralkylene, cycloalkylene, arylene, and alkarylene, including such radicals when inertly substituted. When R' is alkylene, it may typically be methylene, ethylene, n-propylene, iso-propylene, n-butylene, i-butylene, sec-butylene, amylene, octylene, decylene, octadecylene, etc. when R'' is aralkylene, it may typically be benzylene, beta-phenylethylene, etc. When R'' is cycloalkylene, it may typically be cyclohexylene, cycloheptylene, cyclooctylene, 2-methylcycloheptylene, 3-butylcyclohexylene, 3-methylcyclohexylene, etc. When R'' is arylene, it may typically be phenylene, naphthylene, etc. When R'' is alkarylene, it may typically be tolylene, xylylene, etc. R'' may be inertly substituted i.e. it may bear a non-reactive substituent such as alkyl, aryl, cycloalkyl, ether, etc. Typically inertly substituted R'' groups may include 3-methoxypropylene, 2-ethoxyethylene, carboethoxymethylene, 4-methylcyclohexylene, p-methylphenylene, p-methylbenzylene, 3-ethyl-5-methylphenylene, etc. The preferred R'' groups may be phenylene or lower alkylene, i.e. $C_1$–$C_{10}$ alkylene, groups including eg methylene, ethylene, n-propylene, ipropylene, butylene, amylene, hexylene, octylene, decylene, etc. R'' may preferably be phenylene or ethylene —$CH_2CH_2$—.

In the above compound, R may be hydrogen or a hydrocarbon selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalkyl, ether, etc. Typically inertly substituted R groups may include 3-methoxypropyl, 2-ethoxyethyl, carboethoxymethyl, 4-methylcyclohexyl, p-methylphenyl, p-methylbenzyl, 3-ethyl-5-methylphenyl, etc. The preferred R groups may be hydrogen or lower alkyl, i.e. $C_1$–$C_{10}$ alkyl, groups including eg methyl, ethyl, n-propyl, i-propyl, butyls, amyls, hexyls, octyls, decyls, etc. R may preferably be hydrogen.

In one of its preferred embodiments, the R'' group of the first reactant may contain a polyoxyalkylene moiety or a polyalkylene imine moiety. Illustrative of the first reactants may be those set forth in the following table, the first listed being preferred:

A. m-phenylenediamine
B. 2,6 - diaminopyridine
C. 1,6 - hexane diamine

The second reactant $R''[NCO)_a(COCl)_{1-a}]_b$, wherein a is 0 or 1 and b is an integer greater than 1, may be a polyisocyanate when a is 1. When a is 0, the second reactant may be a poly (carbonyl chloride). Preferably a is 1 and b is 2 i.e the preferred second reactant is a diisocyanate when the first reactant is polyethyleneimine.

R'' in the second reactant may be selected from the same group as that from which R'' in the first reactant is selected. In the preferred embodiment, R'' in the first reactant may be different from the R'' in the second reactant; and preferably at least one of the R'' groups is aromatic.

The preferred polyisocyanates (i.e. monomeric compounds bearing a plurality of —NCO isocyanate groups) may include those which contain an aromatic nucleus, typically a toluene diisocyanate or a phenylene diisocyanate.

The preferred poly (carbonyl chlorides) i.e. monomeric compounds bearing a plurality of —COCl carbonyl chloride groups) may include those which contain an aromatic nucleus.

Illustrative second reactants may include the following, the first listed being preferred when the polymer is prepared in situ:

TABLE 1,3,5 benzene tri(carbonyl chloride)
suberoyl dichloride
meta-phenylene diisocyanate
2,4-toluene diisocyanate
3,5-toluene diisocyanate
para-phenylene diisocyanate
hexamethylene diisocyanate
isophthaloyl dichloride
terephthaloyl dichloride In practice of the process of this invention, the separating membrane layer may be formed in situ by interfacial polymerization. This may be effected as by casting the membrane on a support layer, such as the preferred porous polysulfone support. In this aspect of the invention, one of the reactants, preferably the first reactant (m-phenylenediamine in 0.5 w % aqueous solution) is poured onto a support membrane and allowed to migrate into the pores of the support membrane over 1–8 minutes, say 2 minutes. The membrane is then held in vertical position for 1 minute to drain excess solution.

The second reactants (e.g 1,3,5 tri(carbonyl chloride and suberoyl dichloride) preferably in 0.3 and 0.6% solutions in a hydrocarbon such as hexane is then poured in equivalent amount carefully onto the surface of the support membrane into which the first reactant has been absorbed. The first and second reactants are allowed to interfacially polymerize at 20° C.–40° C., say 25° C. for 10–60 seconds, say 15 seconds. The excess of unreacted second reactant may then be carefully poured off to terminate the interfacial reaction process. The so-formed assembly may be heat cured at 120°–140° C., say 125° C. for 10–30 minutes, say 15 minutes. During this curing, thermal cross-linking may complete the fabrication of the barrier layer.

THE COMPOSITE MEMBRANE

It is a feature of this invention that it may utilize a composite membrane which comprises (i) an optional carrier layer characterized by porosity and mechanical strength, for supporting a porous support layer and a separating layer (ii) preferably a porous support layer such as a polysulfone membrane of molecular weight of 5,000–100,000, of thickness of 10–80 microns, and of molecular weight cutoff of 25,000–100,000, and (iii) as a non-porous separating layer a polyimine of molecular weight $\overline{M}_n$ of 40,000–100,000, which has been cross-linked with a polyisocyanate or a poly(carbonyl chloride).

It is possible to utilize a spiral wound module which includes a non-porous separating layer membrane mounted on a porous support layer and a carrier layer, the assembly being typically folded and bonded or sealed along all the edges but an open edge —to form a bag-like unit which preferably has the separating layer on the outside. A cloth spacer, serving as the permeate or discharge channel is placed within the bag-like unit. The discharge channel projects from the open end of the unit.

There then placed on one face of the bag-like unit, adjacent to the separating layer, and coterminous therewith, a feed channel sheet —typically formed of a plastic net.

The so-formed assembly is wrapped around a preferably cylindrical conduit which bears a plurality of perforations in the wall —preferably in a linear array which is as long as the width of the bag-like unit. The projecting portion of the discharge channel of the bag-like unit is placed over the perforations of the conduit; and the bag-like unit is wrapped around the conduit to form a spiral wound configuration. It will be apparent that, although only one feed channel is present, the single feed channel in the wound assembly will be adjacent to two faces of the membrane layer. The spiral wound configuration may be formed by wrapping the assembly around the conduit a plurality of times to form a readily handlable unit. The unit is fitted within a shell (in manner comparable to a shell-and-tube heat exchanger) provided with an inlet at one end and an outlet at the other. A baffle like seal between the inner surface of the shell and the outer surface of the spiral-wound unit prevents fluid from bypassing the operative membrane system and insures that fluid enters the system principally at one end. The permeate passes from the feed channel, into contact with the separating layer and thence therethrough, into the permeate channel and thence therealong to and through the perforations in the conduit through which it is withdrawn as net permeate.

In use of the spiral wound membrane, charge liquid is permitted to pass through the plastic net which serves as a feed channel and thence into contact with the non-porous separating membranes. The liquid which does not pass through the membranes is withdrawn as retentate. The liquid which permeates the membrane passes into the volume occupied by the permeate spacer and through this permeate channel to the perforations in the cylindrical conduit through which it is withdrawn from the system.

In another embodiment, it is possible to utilize the system of this invention as a tubular or hollow fibre. In this embodiment, the polysulfone porous support layer may be extruded as a fine tube with a wall thickness of typically 0.001–0.1mm. The extruded tubes are passed through a bath of polyethyleneimine which is cross-linked and cured in situ. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating layer and permeate is collected in the shell side.

REVERSE OSMOSIS

It is a feature of the non-porous cross-linked polyimine separating layer that it is found to be particularly effective when used in a reverse osmosis process. In reverse osmosis, a charge liquid containing a more permeable and a less permeable component is maintained in contact with a non-porous separating layer; and a pressure drop is maintained across that layer. A portion of the charge liquid dissolves into the membrane and diffuses therethrough. The permeate passes through the membrane and exits as a liquid.

It is a feature of this invention that the novel membrane may be particularly useful in reverse osmosis processes for treatment of aqueous solutions.

In practice of the process of this invention, the charge aqueous solution in liquid phase at 20° C.–40° C., say 25° C. may be passed into contact with the non-porous separating layer of the membrane of this invention. A pressure drop of about 500–1000 psi, say 750 psi is commonly maintained across the membrane. The feed or charge side of the membrane is at pressure sufficient to drive permeate across said membrane by reverse osmosis and commonly about 750 psig; and the permeate or discharge side of the membrane is at about atmospheric pressure.

The permeate which passes through the membrane includes water and a substantially decreased concentration of organic from the charge liquid. Typically, the permeate contains 94–100, say 99.9 w % water. Permeate is recovered in liquid phase.

Reverse osmosis may typically be carried out at a flux of 5–30, say 10 gallons per square foot per day. Typiclly, the units may have a rejection of more than 85% and typically 85–99.3 w %, say as high as 99+%. Rejection % =

Rejection % =

$$\frac{(\text{Feed Concentration} - \text{Permeate Concentration})}{\text{Feed Concentration}} \times 100$$

Practice of the process of this invention will be apparent to those skilled in the art from inspection of the following examples wherein, as elsewhere in this specification, all parts are parts by weight unless otherwise stated.

DESCRIPTION OF SPECIFIC EMBODIMENTS

EXAMPLE I

In this Example, which represents the best mode presently known of carrying out the process of this invention, the selective separating layer is mounted on, as a porous support layer, a microporous polysulfone layer of molecular weight cut-off of 20,000.

The backbone of the selective separating layer is the Corcat P-600 polyethyleneimine (PEI) made from solution A of the Table supra of molecular weight $\overline{M}_n$ of 60,000. This 33 w % aqueous solution is diluted to 2 w % by addition of water.

The assembly containing the preferred microporous polysulfone supra of molecular weight cut off 20,000 as porous support layer, and the preferred non-woven polyester backing supra as carrier layer (total area of ca 30 cm²) is contacted for 2 minutes with an excess of the diluted aqueous solution of Corcat P-600 polyethyleneimine (PEI). Excess solution is then poured off by holding the membrane for 1 minute in vertical position. Cross-linking agent (0.5 w % 2,4-toluene diisocyanate TDI in hexane) is added and contacts the PEI layer for 15 seconds during which time interfacial cross-linking occurs. The membrane is heat cured at 125° C. for 15 minutes.

EXAMPLE II

In this Example, the carrier layer and the porous support layer are the same as in Example I. The selective separating layer is formed by depositing a 0.5 w % solution of the polyethyleneimine on top of the sulfone for 8 minutes. Interfacial cross-linking is then effected for 15 seconds with a 0.5 w % solution of 2,4-toluene diisocyanate in hexane. Heat curing is carried out at 125° C. for 15 minutes.

EXAMPLE III

In this Example, the carrier layer and the porous support layer are the same as in Example I. The selective separating layer is formed by depositing on the polysulfone support layer, a 0.5 w % aqueous solution of meta-phenylene diamine contact being maintained for 2 minutes followed by drainage for 1 minute. A solution of benzene tricarbonyl chloride (3 w %) and suberoyl dichloride (0.6 w %) in hexane is added at 25° C. for 15 seconds during which polymerization and cross-linking occur. The membrane is cured at 125° C. for 15 minutes.

EXAMPLE IV

In this Example, the carrier layer and the polysulfone porous support layer are the same as in Example I. An aqueous solution (1 w %) of polyethyleneimine is deposited on top of the polysulfone layer and left there for 2 minutes. Interfacial cross-linking is then effected by addition at 25° C. of a 0.5 w % solution of 2,4-toluene diisocyanate in hexane which is permitted to remain in contact for 15 seconds. The membrane is then heat cured at 125° C. for 15 minutes.

EXAMPLE V

In this Example, the procedure of Example IV is carried out except that the membrane is heat cured at 135° C. for 15 minutes.

EXAMPLE VI*

In this control Example, the membrane employed is the commercially available UOP RC-100 membrane which contains a polysulfone support layer and a separating layer formed by interfacially crosslinking, with 2,4-toluene diisocyanate, the Epiamine brand of polymer, to form a product having the following formula

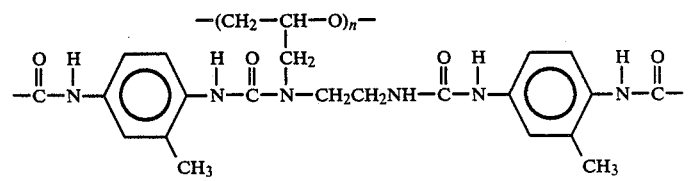

EXAMPLE VII*

In this control Example, the membrane is the commercially available FilmTec FT-30 membrane which includes a polysulfone support layer and a separating layer which is formed by interfacial pol of m-phenylene diamine and benzene tricarbonyl chloride

EXAMPLE VIII-XII*

Each of the membranes of Example I-III and VI-VII on a polysulfone porous support layer backed by a polyester support layer (surface area of ca 46 sq. cm) is mounted in a standard reverse osmosis cell.

There is charged to each cell 300 gallons /day of 5 w % aqueous solution of isopropanol at 750 psig and 25° C. The flux (gallons per square foot per day) is measured. The rejection (%) is calculated as 100 x (the quantity of alcohol in the feed minus the quantity of alcohol in the permeate) divided by the quantity of alcohol in the feed. The permeate (recovered in liquid phase) is a solution containing a lower concentration of alcohol than is present in the charge; and the retentate is a solution (recovered in liquid phase) containing a higher concentration of alcohol than is found in the charge.

TABLE

| Example | Membrane of Example | Flux (gfd) | Rejection % |
|---|---|---|---|
| VIII | I | 5.1 | 99.9 |
| IX | II | 8.9 | 92.9 |
| X | III | 2.6 | 95.5 |
| XI* | VI* | 15.3 | 85.1 |
| XII* | VII* | 12.8 | 75.4 |

*An asterisk indicates a control example

From the above, the following conclusions may be drawn:
(i) It is possible by use of the membranes of Examples I—III of this invention in Examples VIII—X to attain satisfactory Rejection —above 95.5% and as high as 99.9%.
(ii) Control Examples XI*–XII* show unsatisfactory Rejection of 75.4–85.1%.
(iii) The Examples of this invention show attainment of these high Rejections at satisfactory rates of Flux.

EXAMPLES XIII–XVI*

In the series of Examples, the membranes employed are those of Examples IV–V and VI*–VII* mounted and tested as set forth in Examples VIII–XII*

The charge liquid is 300 gallons/day of 1 w % aqueous solution of ethylene glycol.

TABLE

| Example | Membrane of Example | Flux (gfd) | Rejection % |
|---|---|---|---|
| XIII | IV | 3.0 | 92.6 |
| XIV | V | 1.0 | 93.7 |
| XV* | VI* | 3.7 | 87.9 |
| XVI* | VII* | 4.0 | 68.9 |

From the above table the following conclusions may be drawn:
(i) It is possible by use of the membranes of Examples IV–V of this invention in Examples XIII–XIV to attain satisfactory Rejection—above 92.6% and as high as 93.7%.
(ii) Control Examples XV*–XVI* show unsatisfactory Rejections of 68.9%–87.9%.
(iii) The Examples of this invention show attainment of these high Rejections at satisfactory rates of Flux.

Results comparable to those of the Experimental Examples of this invention may be attained if the separating layer is formed by crosslinking polyethyleneimine with:

TABLE

| Example | Crosslinking Agent |
|---|---|
| XVII | m-phenylene diisocyanate |
| XVIII | p-phenylene diisocyanate |
| XIX | m-phenylene diisocyanate and hexamethylene diisocyanate |

Results comparable to those of the Experimental Examples of this invention may be attained if the charge solution is as follows:

TABLE

| Example | Charge Solution |
|---|---|
| XXI | 5 w % ethylene glycol |
|  | 95 w % water |
| XXII | 5 w % ethanol |
|  | 95 w % water |
| XXIII | 8 w % acetic acid |
|  | 92 w % water |
| XXIV | 10 w % acetaldehyde |
|  | 90 w % water |

Although this invention has been illustrated by reference to specific embodiments, it will be apparent to those skilled in the art that various charges and modifications may be made which clearly fall within the scope of the invention.

I claim:
1. The method which comprises
passing a char dilute solution of an organic oxygen-containing liquid component containing up to 30% of organic oxygen containing liquid component; which is soluble in water into contact with, as reverse osmosis membrane, a non-porous separating polyimine layer which has been cross-linked with a polyisocyanate or with a poly(carbonyl chloride) cross-linking agent;
maintaining a pressure drop across said membrane thereby forming a high pressure retentate containing increased content of organic oxygen-containing component and decreased content of water and a low pressure permeate of increased content of water and decreased content of organic oxygen-containing component;
maintaining the pressure on the low pressure discharge side of said membrane above the vapor pressure of said permeate thereby maintaining said permeate in liquid phase;
maintaining the pressure on the high pressure retentate side of said membrane above the vapor pressure of said charge aqueous dilute solution and of said retentate and sufficient to drive permeate across said membrane by reverse osmosis thereby maintaining said charge aqueous dilute solution and said retentate in liquid phase;
recovering said permeate of increased content of water and decreased content of organic oxygen-containing component, in liquid phase from the low pressure discharge side of said membrane; and
recovering said retentate of increased content of organic oxygen-containing component and decreased content of water, in liquid phase from the high pressure side of said membrane.
2. The method of claim 1 wherein said charge organic oxygen-containing component is an alcohol, a glycol, an organic carboxylic acid, a polyol, an aldehyde, or a ketone.

3. The method of claim 1 wherein said charge organic oxygen-containing component is an alcohol.

4. The method of claim 1 wherein said charge organic oxygen-containing component is isopropanol.

5. The method of claim 1 wherein said charge organic oxygen-containing component is glycol.

6. The method of claim 1 wherein said charge organic oxygen-containing component ethylene glycol.

7. The method of claim 1 wherein said charge organic oxygen-containing component organic carboxylic acid.

8. The method of claim 1 wherein said charge organic oxygen-containing component is a polyol.

9. The method of claim 1 wherein said charge organic oxygen-containing component is an aldehyde.

10. The method of claim 1 wherein said charge organic oxygen-containing component is a ketone.

11. The method of claim 1 wherein said cross-linking agent is a diisocyanate.

12. The method of claim 1 wherein said cross-linking agent is a toluene diisocyanate.

13. The method of claim 1 wherein said cross-linking agent is a phenylene diisocyanate.

14. The method of claim 1 wherein said cross-linking agent is a di (carbonyl chloride).

15. The method of claim 1 wherein said cross-linking agent is suberoyl dichloride.

16. The method of claim 1 wherein said cross-linking agent is isophthaloyl dichloride.

17. The method which comprises
passing a charge aqueous dilute solution containing 0.5–30 w % ethylene glycol into contact with, as a reverse osmosis membrane, a non-porous separating polyethyleneimine layer which has been cross-linked with 2,4-toluene diisocyanate cross-linking agent;
maintaining a pressure drop of about 500–1000 psi across said membrane thereby forming a high pressure retentate containing increased content of ethylene glycol and decreased content of water and a low pressure permeate of increased content of water and decreased content of ethylene glycol;
maintaining the pressure on the low pressure discharge side of said membrane above the vapor pressure of said permeate thereby maintaining said permeate in liquid phase;
maintaining the pressure on the high pressure retentate side of said membrane above the vapor pressure of said charge aqueous dilute solution and of said retentate and sufficient to drive permeate across said membrane by reverse osmosis thereby maintaining said charge aqueous dilute solution and said retentate in liquid phase;
recovering said permeate of increased content of water and decreased content of ethylene glycol, in liquid phase, from the low pressure discharge side of said membrane; and
recovering said retentate of increased content of ethylene glycol and decreased content of water, in liquid phase, from the high pressure side of said membrane 18. passing a charge aqueous dilute solution containing 0.5–30 w % isopropanol into contact with, as a reverse osmosis membrane, a non-porous separating polyethyleneimine layer which has been cross-linked with 2,4-toulene diisocyanate cross-linking agent;
maintaining a pressure drop of about 500–1000 psi across said membrane thereby forming a high pressure retentate containing increased content of isopropanol and descreased content of water and a low pressure permeate of increased content of water and decreased content of isopropanol;
maintaining the pressure on the low pressure discharge side of said membrane above the vapor pressure of said permeate thereby maintaining said permeate in liquid phase;
maintaining the pressure on the high pressure retentate side of said membrane above the vapor pressure of said charge aqueous dilute solution and of said retentate and sufficient to drive permeate across said membrane by reverse osmosis thereby maintaining said charge aqueous dilute solution and said retentate in liquid phase;
recovering said permeate of increased content of water and decreased content of isopropanol, in liquid phase, from the low pressure discharge side of said membrane; and
recoverying said retentate of increased content of isopropanol and decreased content of water, in liquid phase, from the high pressure side of said membrane.

* * * * *

UNITED STATES PATENT AND TRADEMARK OFFICE
CERTIFICATE OF CORRECTION

PATENT NO. : 4,865,745
DATED : September 12, 1989
INVENTOR(S) : Mordechai PASTERNAK It is certified that error appears in the above-identified patent and that said Letters Patent is hereby corrected as shown below:

Col 12, line 31, correct the spelling of "charge;

Col 13, line 6, after "is", insert -- a --;

Col 13, line 8, after "component", insert -- is --;

Col 13, line 10, after "component, insert -- an --.

Signed and Sealed this

Third Day of September, 1991

*Attest:*

HARRY F. MANBECK, JR.

*Attesting Officer*     *Commissioner of Patents and Trademarks*